United States Patent [19]
Sakano

[11] Patent Number: 5,579,417
[45] Date of Patent: Nov. 26, 1996

[54] IMAGE PROCESSING APPARATUS

[75] Inventor: Yukio Sakano, Fuchu, Japan

[73] Assignee: Ricoh Company, Ltd., Tokyo, Japan

[21] Appl. No.: 429,007

[22] Filed: Apr. 26, 1995

Related U.S. Application Data

[63] Continuation of Ser. No. 10,259, Jan. 28, 1993, abandoned.

[30] Foreign Application Priority Data

Jan. 28, 1992 [JP] Japan .................................... 4-013243

[51] Int. Cl.$^6$ .................................................. G06K 9/32
[52] U.S. Cl. .......................... 382/298; 382/264; 382/266
[58] Field of Search .................................. 382/298, 299, 382/300, 301, 293, 254, 260, 261, 262, 263, 264, 266, 267, 268, 269, 199; 358/451, 447, 468; 355/55, 56, 133

[56] References Cited

U.S. PATENT DOCUMENTS

| | | | |
|---|---|---|---|
| 4,707,745 | 11/1987 | Sakano | 358/456 |
| 5,083,216 | 1/1992 | Abuyama | 358/451 |
| 5,086,346 | 2/1992 | Fuisawa | 382/47 |
| 5,144,456 | 9/1992 | Sakano | 358/443 |
| 5,166,810 | 11/1992 | Sorimachi et al. | 358/462 |
| 5,200,840 | 4/1993 | Koike et al. | 358/451 |

*Primary Examiner*—Leo Boudreau
*Assistant Examiner*—Phuoc Tran
*Attorney, Agent, or Firm*—Woodcock Washburn Kurtz Mackiewicz & Norris

[57] ABSTRACT

A image processing apparatus is disclosed. The apparatus comprises filters for enhancing or smoothing edges of an image signal, magnifier for magnifying the image signal, and controller for changing an order of the filtering means and the magnifying according to magnification ratio. In accordance with one aspect of the invention, a size of a filter is used efficiently and therefore a high quality image is achieved.

8 Claims, 8 Drawing Sheets

MAIN SCANNING DIRECTION

FIG. 14A    INPUT SIGNAL

|   | -3 | -2 | -1 | 0 | 1 | 2 | 3 | 4 | 5 | 6 | 7 | 8 | 9 |
|---|----|----|----|---|---|---|---|---|---|---|---|---|---|
| -2 | 8 | 8 | 8 | 8 | 8 | 8 | 8 | 8 | 8 | 8 | 8 | 8 | 8 |
| -1 | 8 | 8 | 8 | 8 | 8 | 8 | 8 | 8 | 8 | 8 | 8 | 8 | 8 |
| 0 | 8 | 8 | 8 | 8 | 8 | 8 | 8 | 8 | 8 | 8 | 8 | 8 | 8 |
| 1 | 8 | 8 | 8 | 8 | 8 | 8 | 16 | 8 | 8 | 8 | 8 | 8 | 8 |
| 2 | 8 | 8 | 8 | 8 | 8 | 16 | 40 | 16 | 8 | 8 | 8 | 8 | 8 |
| 3 | 8 | 8 | 8 | 8 | 8 | 8 | 16 | 8 | 8 | 8 | 8 | 8 | 8 |
| 4 | 8 | 8 | 8 | 8 | 8 | 8 | 8 | 8 | 8 | 8 | 8 | 8 | 8 |
| 5 | 8 | 8 | 8 | 8 | 8 | 8 | 8 | 8 | 8 | 8 | 8 | 8 | 8 |
| 6 | 8 | 8 | 8 | 8 | 8 | 8 | 8 | 8 | 8 | 8 | 8 | 8 | 8 |

FIG. 14B    OUTPUT SIGNAL (MTF CORRECTION)

|   | -1 | 0 | 1 | 2 | 3 | 4 | 5 | 6 | 7 |
|---|----|---|---|---|---|---|---|---|---|
| -1 | 8 | 8 | 8 | 8 | 8 | 8 | 8 | 8 | 8 |
| 0 | 8 | 8 | 8 | 8 | 4 | 8 | 8 | 8 | 8 |
| 1 | 8 | 8 | 7 | 1 | 16 | 1 | 7 | 8 | 8 |
| 2 | 8 | 7 | 1 | 16 | 90 | 16 | 1 | 7 | 8 |
| 3 | 8 | 8 | 7 | 1 | 16 | 1 | 7 | 8 | 8 |
| 4 | 8 | 8 | 8 | 8 | 4 | 8 | 8 | 8 | 8 |
| 5 | 8 | 8 | 8 | 8 | 8 | 8 | 8 | 8 | 8 |

FIG. 14C

OUTPUT SIGNAL
(SMOOTHING)

|   | -1 | 0 | 1 | 2 | 3 | 4 | 5 | 6 | 7 |
|---|----|---|---|---|---|---|---|---|---|
| -1 | 8 | 8 | 8 | 8 | 8 | 8 | 8 | 8 | 8 |
| 0 | 8 | 8 | 8.5 | 8.5 | 8.5 | 8.5 | 8.5 | 8 | 8 |
| 1 | 8 | 8.5 | 11 | 11.5 | 12 | 11.5 | 11 | 8.5 | 8 |
| 2 | 8 | 8.5 | 11.5 | 12 | 14 | 12.5 | 11.5 | 8.5 | 8 |
| 3 | 8 | 8.5 | 11 | 11.5 | 12 | 11.5 | 11 | 8.5 | 8 |
| 4 | 8 | 8 | 8.5 | 8.5 | 8.5 | 8.5 | 8.5 | 8 | 8 |
| 5 | 8 | 8 | 8 | 8 | 8 | 8 | 8 | 8 | 8 | ns
IMAGE PROCESSING APPARATUS

This is a continuation of U.S. patent application Ser. No. 08/010,259, filed Jan. 28, 1993, now abandoned.

BACKGROUND OF THE INVENTION

1. Field of the invention

The present invention relates to an image processing apparatus for use in a digital copying machine. The invention relates, more particularly, to an image processing apparatus with a magnification function for enlarging or reducing a document.

2. Discussion of Background

There are many conventional image processing apparatus which have a magnification function for enlarging or reducing. For example, Japan Patent Laid-Open Publications Nos. 223275/1990 and 277660/1990 disclose such apparatus.

FIG. 13 shows a conventional image processing apparatus which has a magnification function. Input signal D1 is smoothed or emphasized in edge by a matrix of a filter 1 and the signal D2 after the filter 1 is enlarged or reduced by a magnifier 2. In smoothing, the ragged edges of an image are smoothed. In emphasizing, the edges of an image are highlighted. An example of emphasizing is found in Japanese Patent Laid Open No. 252261/1987. Then the signal D3 after the magnifier 2 is converted by a gamma converter 3 and the signal D4 after the gamma converter 3 is gradated by a gradating block 4. The signal D5 after the gradating block 4 is output to a writer. Also as conventional apparatus, there is a device in which a signal is magnified by the magnifier 2 and after that it is smoothed or emphasized in edge by the filter 1.

However, in the conventional apparatus in which the signal is filtered by a filter and after that magnified by a magnifier, the following problem occurs. When the signal is enlarged, the matrix size of the filter can be used effectively, however, when it is reduced, the matrix size of the filter cannot be used effectively. Also in the conventional apparatus in which the signal is magnified by the magnifier and after that filtered by the filter, the following problem occurs. When the signal is reduced, the matrix size of the filter can be used effectively, however, when it is enlarged, it cannot be used effectively.

As a result, in those conventional apparatus, where the order of filtering and magnifying is fixed, there is a problem in the filter cannot be used effectively for at least one of the magnifying and reducing operations.

SUMMARY AND OBJECT OF THE INVENTION

Accordingly, it is an object of the present invention to provide an image processing apparatus in which the matrix of a filter is used effectively to achieve a high quality image.

It is another object of the present invention to provide an image processing apparatus in which the arrangement of a filter and a magnifier is changed according to whether reducing or enlarging is being accomplished and therefore the matrix of the filter is used effectively to achieve a high quality image.

These and other objects and advantages are achieved by the present invention which provides for an image processing apparatus comprising filters constituting filtering means for enhancing or smoothing edges of an image signal, a magnifier for magnifying the image signal and a controller for changing the order of the filtering means and the magnifier according to a predetermined magnification ratio. In accordance with one aspect of the invention, the size of a filter is used efficiently and therefore a high quality image is achieved.

BRIEF DESCRIPTION OF THE DRAWING

In describing a preferred embodiment of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

A more complete appreciation of the invention and the many attendant advantages thereof will become readily apparent from the following detailed description, particularly when considered in conjunction with the drawings in which:

FIGS. 14(a), 14(b), and 14(c) shows filters for use in explaining filter operations associated with FIGS. 3 and 4.

DESCRIPTION OF THE PREFERRED EMBODIMENTS

Figure 9:
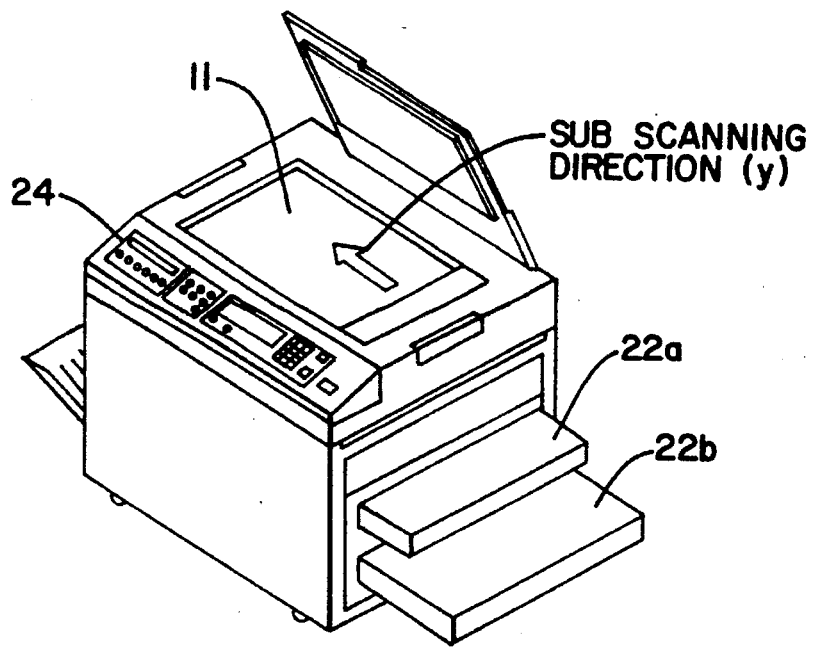
FIG. 9 is a schematic diagram showing a digital copying machine embodying the image processing apparatus of the present invention.
Figure 10:
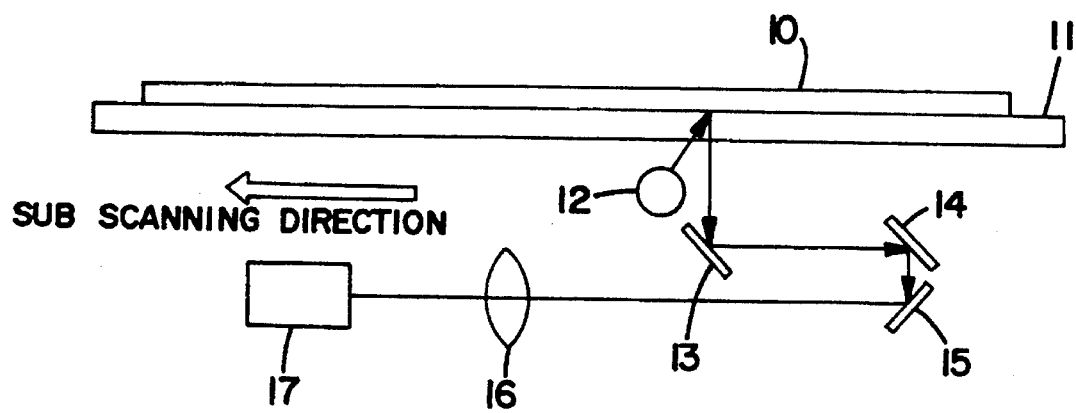
FIG. 10 is a schematic diagram showing an optical system of a scanning block in the digital copying machine of FIG. 9.

Referring now to the Figures, an embodiment of the present invention will be described. Initially, referring to FIGS. 9–12, a digital copying machine where an image processing apparatus is applied will be described. One such copier is made by Ricoh Company, Ltd. under model number 05320. Also see U.S. Pat. No. 5,122,833 and copending U.S. patent application No. 870,453. A document 10 (FIG. 10) is set on a document plate 11 so that the face of the scanned side of the document is in contact with the plate. The underside of the document is scanned by the scanning block in FIG. 10. In FIG. 10, the scanned side of the document is illuminated by a light resource 12 which extends in a main scanning direction X (the vertical direction of a paper face). The light reflected from the document is deflected by a first mirror 13, a second mirror 14 and a third mirror 15 in that order. The light from the mirror 15 is focused on a CCD image sensor 17 by a lens 16 and then is scanned.

Figure 11:
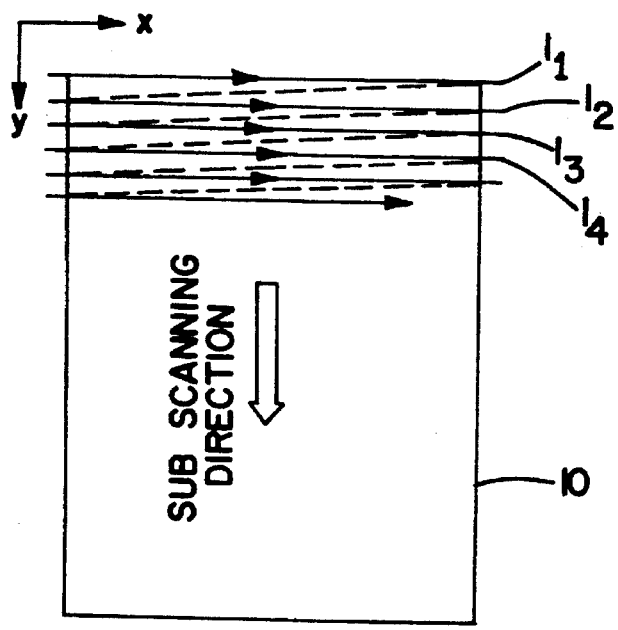
FIG. 11 shows scanning in main and sub directions in the scanning block of FIG. 10.

As shown in FIG. 11, scanning in the main direction of the document 10 is carried out electrically by the CCD image sensor 17 (the lines in FIG. 11), scanning in the sub direction of the document 10 is carried out by controlled relative movement of the CCD image sensor 17 and the document 10. Now the optical system of this scanner can be scanned with a resolution of 400 dpi in both x and y directions.

Figure 12:
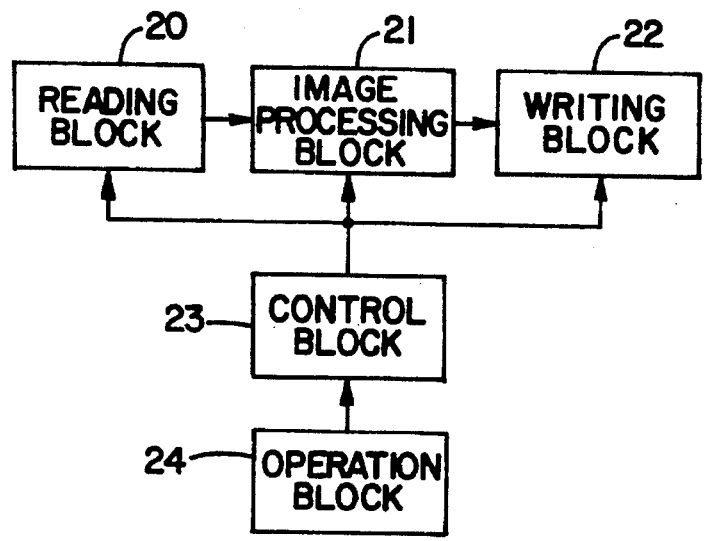
FIG. 12 is a block diagram showing signal flow in the digital copying machine of FIG. 9.

In FIG. 12, a signal scanned by the CCD image sensor 17 in the optical system is subjected to amplification, A/D conversion, shading correction, etc. in reading block 20. The signal from the reading block is then subjected to filtering, magnification, gamma conversion, gradation, etc. in image processor 21. In a writing block 22, the output signal of the image processor modulates a laser beam to form a latent image on a photoconductive element in the copier of FIG. 9. The latent image is developed and then the image is transferred to a sheet of paper from sheet cassettes 22a and 22b as shown in FIG. 9. The image on the sheet of paper is then fixed. Also, when in gradation mode, printing density, magnification ratio, etc. are set by an operating block 24. In this way, the operations of the reading block 20, the image processing block 21 and the writing block 22 are controlled.

The magnification ratio is defined as (the image size of the writing block)/(the image size of the document) and is provided for both reduced and enlarged images. The magnification in the sub scanning direction y is carried out by changing the speed of the reading block. Thus, the change is made mechanically. On the other hand, the magnification in the main direction x is carried out by a supplemental operation on the image data with a sampling pitch after the magnification. Thus, the change is made electrically as described below.

In the gradation mode, for example, the three modes of character mode, character/photograph mode and photograph mode are selectively carried out. In the character mode, enhancement processing is carried out so as to sharply enhance the image. In the photograph mode, half tone processing is carried out so as to have smooth gradation. In the character/photograph mode, middle level processing between the character mode and the photograph mode is carried out.

Moreover in the filtering operation, MTF correction which enhances the edge of the image or smoothing which smoothes an image is carried out. Plural filters are installed so as to be able to select a desired enhancement degree of MTF correction or smoothing. Selecting the filters is determined in accordance with the gradation mode and the magnification ratio considering whether the MTF correction is selected or the smoothing is selected and what the enhancement degree of the MTF correction or the smoothing is.

Figure 1:
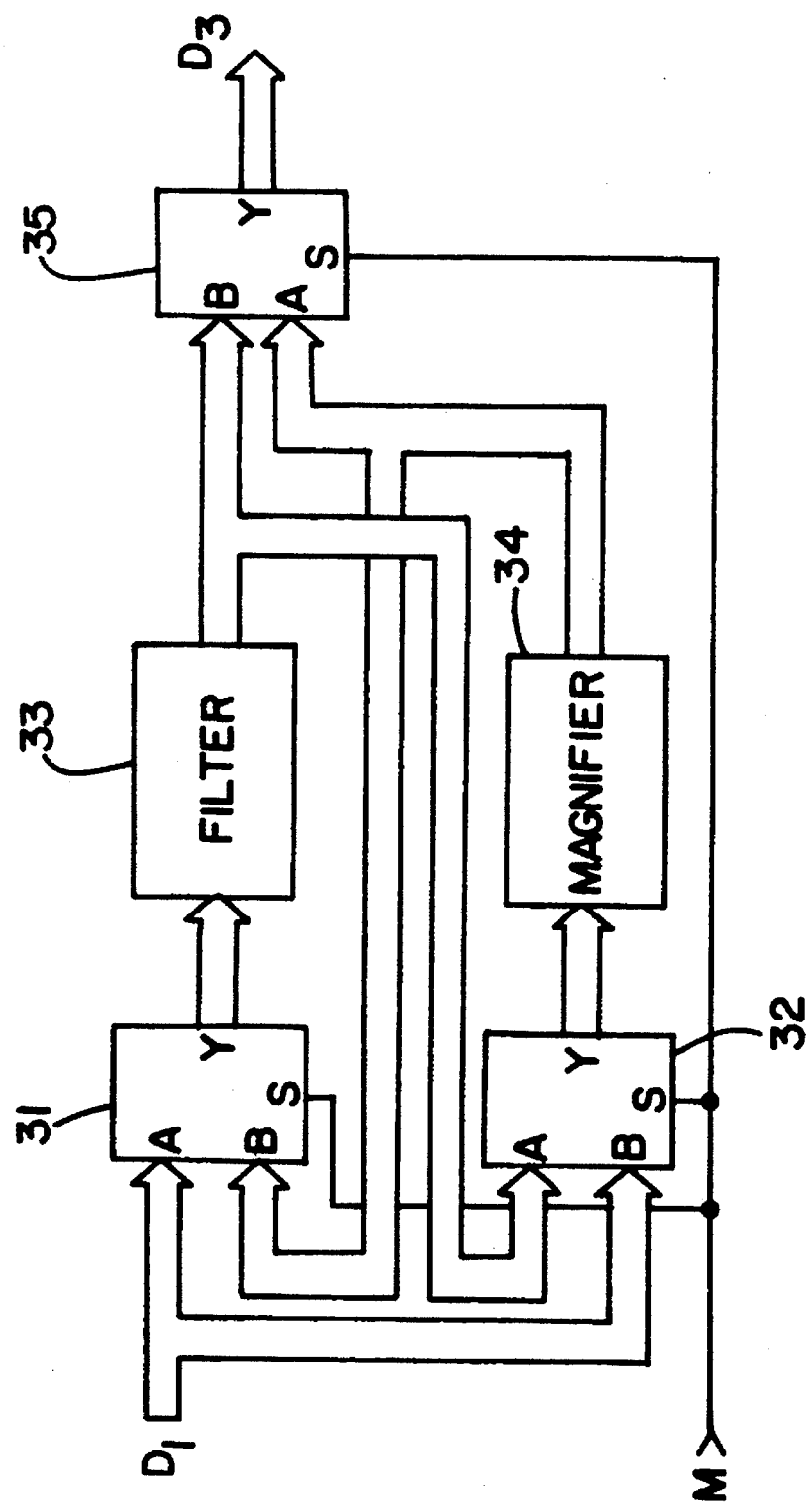
FIG. 1 is a block diagram of an embodiment of the present invention.
Figure 3:
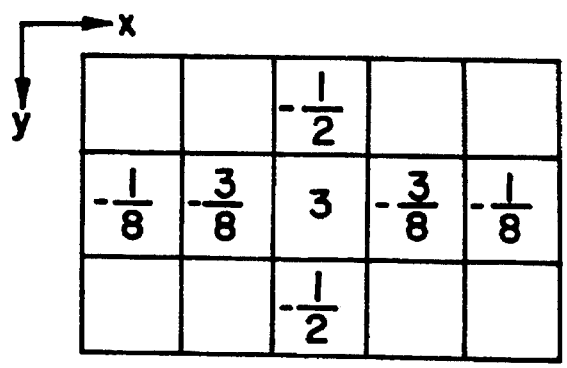
FIG. 3 shows a filter of MTF correction as a filter for use with the embodiment of FIG. 1.
Figure 4:
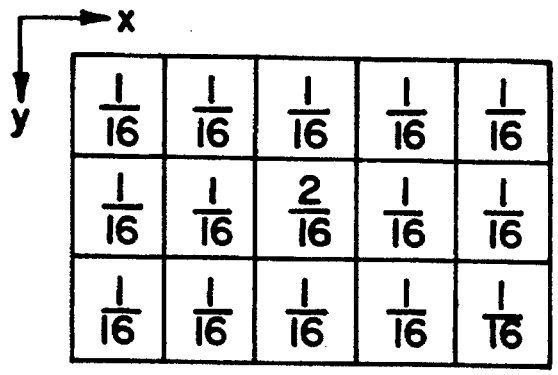
FIG. 4 shows a filter-of-filtering as a filter for use with the embodiment of FIG. 1.

Next, referring to FIGS. 1–8, an image processing apparatus embodying the teachings of the present invention will be described. In FIG. 1, a signal D1 is input to an input terminal A of a selector 31 and an input terminal B of a selector 32. The D1 signal is received from reading block 20 where an A/D conversion takes place. The signal output from terminal Y of selector 31 is input to filter 33, where either the edges of the signal are enhanced as shown in FIG. 3 or the signal is smoothed as shown in FIG. 4. A signal from the filter 33 is input to an input terminal A of a selector 32 and an input terminal B of a selector 35. A signal from the Y output of the selector 32 is enlarged or reduced in a magnifier 34 as shown in FIGS. 5–8. A signal from the output of the magnifier 34 is input to the B input terminal of the selector 31 and the A input terminal of the selector 35.

Figure 13:
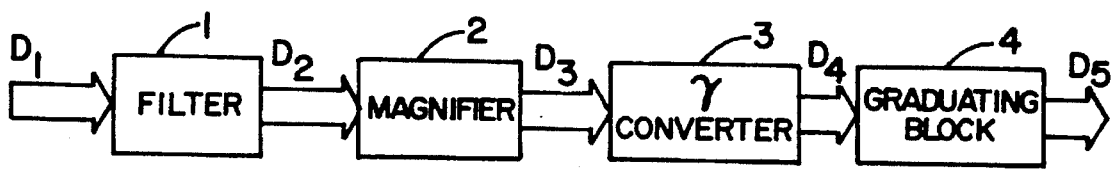
FIG. 13 is a block diagram showing a conventional prior art image processing apparatus.

Input selection of the selector 31, the selector 32 and the selector 35 is carried out by a control signal M from the control block 23 in FIG. 12. When a signal of selection control terminal S is "0" the signal of the input terminal A is selected. When it is "1" the signal of the input terminal B is selected. Therefore a signal from the filter 33 or the magnifier is output via the selector 35 (an output signal D3). Now the signal D3 is output to the gamma converter 3 as shown in FIG. 13.

The signal M from the controlling block 23 is set as follows. The magnification ratio which is set via the operation block 24 as shown in FIG. 12 is 100% or more, M is set to "0". When it is less than 100%, M is set to "1". Therefore when M is "0" the input signal D1 flows in the selector 31, the filter 33, the selector 32, the magnifier 34 and the selector 35 in that order. On the other hand, when M is "1" the input signal D1 flows in the selector 32, the magnifier 34, selector 31, the filter 33 and the selector 35 in that order. That is, when M is "0" the signal flows in the filter 33 and after that it flows in the magnifier 34. When M is "1", the signal flows in the magnifier 34 and after that it flows in the filter 33.

Figure 2:
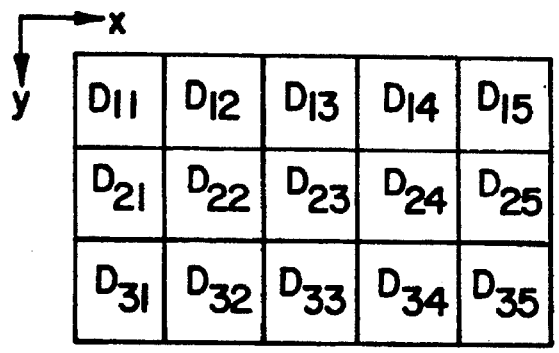
FIG. 2 shows an input signal to a filter for use with the embodiment of FIG. 1.

The input signal D1 is processed, for example, in 5*3 pixel units including a center pixel D23 as shown in FIG. 2. D11–15, D21–25 and D31–35 indicate tone density. The MTF correction of the filter 33 enhances an edge by correcting D23' as indicated in equation (1), for example, on the basis of coefficients as shown in FIG. 3.

$$D23'=3*D23+(-\tfrac{1}{2})*(D13+D33)+(-\tfrac{3}{8})*(D22+D24)+(-\tfrac{1}{8})*(D21+D25) \quad (1)$$

When actual values of the input signal in FIG. 14(a) are substituted, D23' is as follows and the output signal is FIG. 14(b).

$$D23'=3*40+(-\tfrac{1}{2})*(16+16)+(-\tfrac{3}{8})*(16+16)+(-\tfrac{1}{8})*(8+8)=90$$

Also the smoothing of the filter 33 smoothes by correcting D23" as indicated in equation (2), for example, on the basis of coefficients as shown in FIG. 4.

$$D23''=(\tfrac{1}{16})*(2*D23+D11+D12+D13+D14+D15+D21+D22+D24+D24+D25+D31+D32+D33+D34+D35) \quad (2)$$

When actual values of the input signal in FIG. 14(a) are substituted, D23" is as follows and the output signal is FIG. 14(c).

$$D23''=(\tfrac{1}{16})*(2*40+16*4+8*10)=14$$

Figure 5:
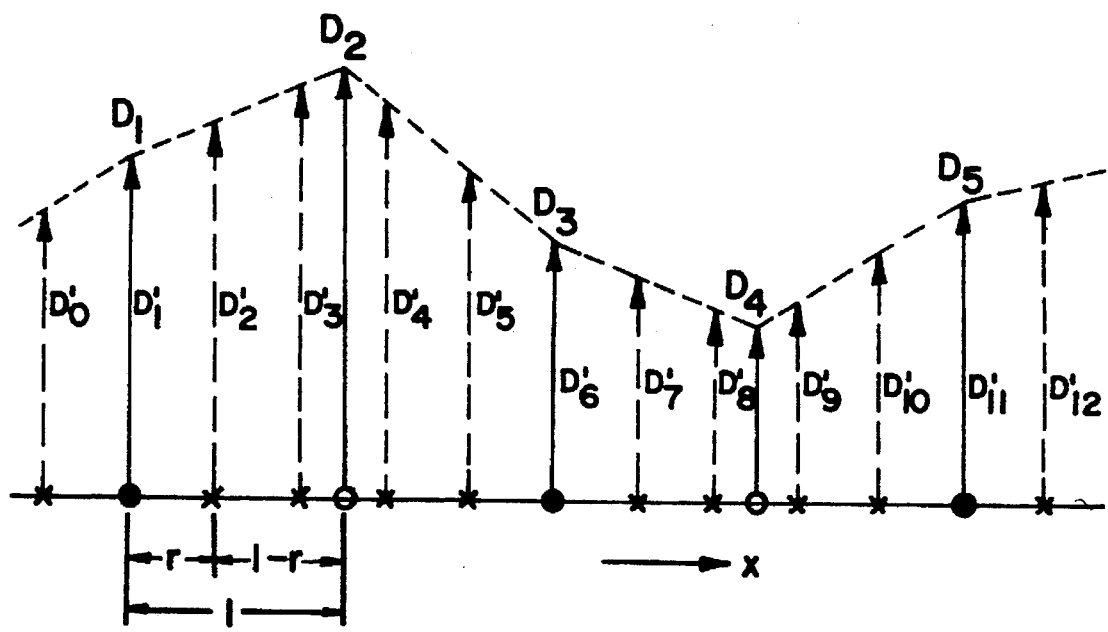
FIG. 5 graphically illustrates the principle of enlarging in a main direction in a magnifier found in the embodiment of FIG. 1.
Figure 6:
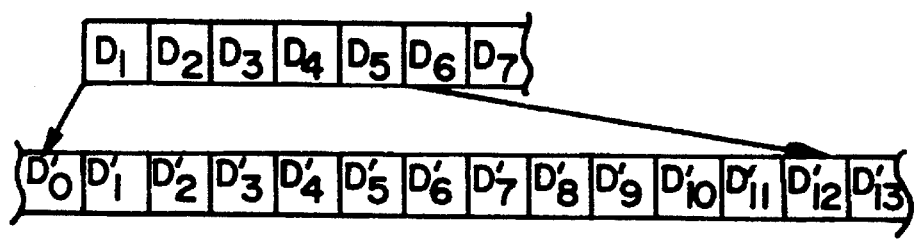
FIG. 6 shows the relationship of a pixel found in a signal both before and after enlarging.

Next, referring to FIGS. 5–8, structure and operation of the present invention will be described In FIG. 5, "o" indicates real sampling points before magnification and D1–D5 indicate tone density in these sampling points. In FIG. 5, "*" indicates imaginary sampling points after magnification and D1'–D5' indicate tone density in these points. Also FIG. 5 shows a case where the magnification ratio is 250%, which is a 2.5 times enlargement. When this magnification ratio is given, the positions of the imaginary sampling points (*) are decided. When an interval between the sampling points is "1" and the interval between the imaginary sampling points "r" D2' which is a signal in a distance r from D1 which is a signal before magnification can be given by "additional weight averaging of two adjacent pixels" as shown in equation (3).

$$D2'=\{(1-r)*D1+r*D2\}/\{(r+(1-r)\}=(1-r)*D1+r*D2 \quad (3)$$

Now the decision method of tone density in the imaginary sampling points is not limited to "additional weight averaging of two adjacent pixels" but many kinds of methods are known, such as, a third order function supplement method. For the tone density D1', the imaginary sampling points are decided as described above and then an enlarged image can be obtained by writing the pixels at the same pitch as before magnifying.

Figure 7:
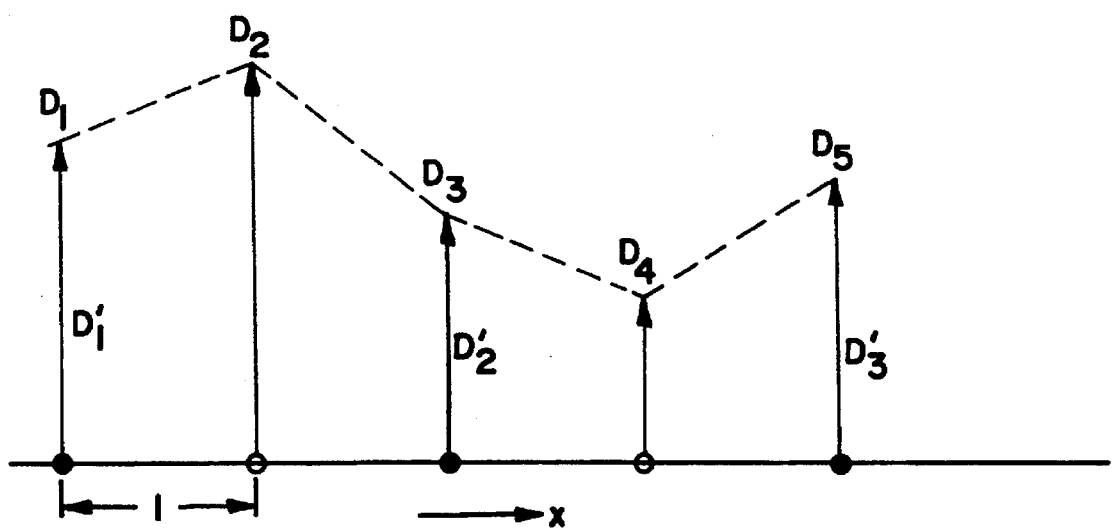
FIG. 7 illustrates the principle of reducing in a main direction in a magnifier of FIG. 1.
Figure 8:
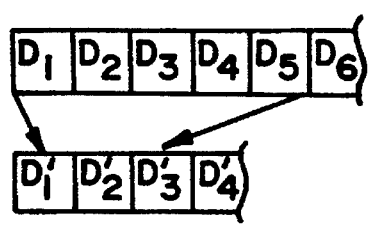
FIG. 8 shows the relationship of a pixel found in a signal both before and after reducing.

FIG. 7 shows a case where the magnification ratio is 50%, which is ½reduction. When this magnification ratio is given, the positions of imaginary sampling points (*) are decided so as to be double interval of real sampling points (o). Thus signals D1'-D3' after reducing are decided by adopting signals D1, D3 and D5 before reducing. Now when in FIG. 7, the positions of the imaginary sampling points do not correspond with those of the real sampling points, the signals D1'-D3' after reducing can be decided in corresponded with the distance by "additional weight averaging of two adjacent pixels" as with the case of enlargement. Then a reduced image can be obtained by writing the pixels at the same pitch as before magnifying.

Next, the relation of the operation between the filter 33 and the magnifier 34 will be described. Regarding the MTF correction and the smoothing by the filter, the size (the matrix size in FIGS. 3 and 4) or the coefficient of the filter affects image quality. As the size of the matrix is increases, the effect of the MTF correction and the smoothing is greater. However, when the size of the filter is larger, the cost of the hardware is higher. As a result, it is desired that the greater effect is obtained by the filter of the proper size.

Now when the signal is enlarged by 2.5 times as shown in FIG. 5 after it is carried out by the filter in which the size in X direction is 5 pixels, the objective pixels of the filter are the signals D1–D5 which are ones before enlarging with D3 being a center pixel. On the other hand, when the signal is carried out by the filter in which the size in the X direction is 5 pixels after it is enlarged by 2.5 times as shown in FIG. 5, the objective pixels of the filter are the signals D4'–D8' which are ones after enlarging (D6' is a center pixel).

Therefore comparing the case of filtering by the filter of 5 pixels size before magnifying to the case of filtering by the same filter after magnifying, the relative sizes of the filter are different. That is, filtering by that filter before magnifying is the same as filtering by a larger size filter than the filter after enlarging. Thus in the enlargement, the cost and the size of the hardware to magnify after filtering is increased.

Next in the reduction, filtering by the filter after reducing is the same as filtering by a larger size filter than the filter before reducing. Therefore in the reduction, it is proper to filter after magnifying.

Therefore, according to the above embodiment, when the magnification ratio is 100% or more (which is enlargement), the signal is carried out by the filter 33 and after that it is carried out by the magnifier 34. On the other hand, when the magnification ratio is less than 100% (which is reduction), the signal is carried out by the magnifier 34 and after that it is carried out by the filter 33. As a result, better image quality can be obtained by the proper size filter.

Modifications and variations of the above-described embodiment of the present invention are possible, as appreciated by those skilled in the art in light of the above teaching. For example, the size or the coefficient of the filter 33 in not limited to the embodiment in FIG. 3 or FIG. 4 and also the magnification method is not limited to the above-described "additional weight averaging of two adjacent pixels". Moreover the changing point of the processing order of the filter 33 and the magnifier 34 is the magnification ratio 100% in above-mentioned embodiment, however, it can be other magnification ratios, for example 80%.

What is claimed is:

1. An image processing apparatus, comprising:
   a) filtering means for enhancing or smoothing edges of an image signal, the filtering means having at least a filtering means input and a filtering means output;
   b) magnifying means for magnifying the image signal, the magnifying means having at least a magnifying means input and a magnifying means output; and
   c) control means, responsive to a magnification ratio signal and connected to the filtering means and the magnifying means, for changing connections among:
      1) the filtering means input,
      2) the filtering means output,
      3) the magnifying means input, and
      4) the magnifying means output
   so as to change the order in which said image signal passes through said filtering means and said magnifying means, wherein the control means constitutes means for changing between a first configuration and a second configuration, wherein:
      A) in the first configuration, the filtering means input is connected to be responsive to the magnifying means output, and the magnifying means input is not responsive to the filtering means output; and
      B) in the second configuration, the magnifying means input is connected to be responsive to the filtering means output, and the filtering means input is not responsive to the magnifying means output.

2. The image processing apparatus of claim 1, further comprising:
   magnification setting means for manually determining the magnification ratio signal.

3. The image processing apparatus of claim 1, wherein:
   if said magnification ratio signal denotes a magnification ratio which is greater than a predetermined magnification ratio, the control means constitutes means for causing said image signal to pass first through said filtering means and then through said magnifying means; and
   if said magnification ratio signal denotes a magnification ratio which is less than said predetermined magnification ratio, the control means constitutes means for causing said image signal to pass first through said magnifying means and then through said filtering means.

4. The image processing apparatus of claim 3, wherein:
   said predetermined magnification ratio is 100%.

5. A copying machine for scanning and printing an image comprising:
   a) filters for enhancing or smoothing edges of an image signal, the filters having at least a filter input and a filter output;
   b) a magnifier for magnifying the image signal, the magnifier having at least a magnifier input and a magnifier output; and
   c) a controller responsive to a predetermined magnification ratio signal and connected to the filters and the magnifier, for changing connections among:

1) the filter input,
2) the filter output,
3) the magnifier input, and
4) the magnifier output, so as to change the order in which said image signal passes through said filters and said magnifier, wherein the controller constitutes means for changing between a first configuration and a second configuration, wherein:

A) in the first configuration, the filter input is connected to be responsive to the magnifier output, and the magnifier input is not responsive to the filter output; and B) in the second configuration, the magnifier input is connected to be responsive to the filter output, and the filter input is not responsive to the magnifier output.

6. The copying machine of claim 5, further comprising: magnification setting means for manually determining the magnification ratio signal.

7. The copying machine of claim 5, wherein:

if said magnification ratio signal denotes a magnification ratio which is greater than a predetermined magnification ratio, the controller constitutes means for causing said image signal to pass first through said filters and then through said magnifier, and if said magnification ratio signal denotes a magnification ratio which is less than said predetermined magnification ratio, the controller constitutes means for causing said image signal to pass first through said magnifier and then through said filters.

8. The copying machine of claim 7, wherein:

said predetermined magnification ratio is 100%.

* * * * *